3,651,200
BIAXIALLY DRAWING POLYAMIDE FILM WITH PRETREATMENT

Mutsuo Kuga, Kyoto-shi, and Takeshi Mashimo, Junkichi Watanabe, Teruo Arai, and Yoshihiko Yano, Uji-shi, Japan, assignors to Unitika Kabushiki Kaisha, Hyogo-ken, Japan
Filed Aug. 28, 1969, Ser. No. 853,687
Claims priority, application Japan, Aug. 31, 1968, 43/62,622
Int. Cl. B29c 17/02
U.S. Cl. 264—289          13 Claims

ABSTRACT OF THE DISCLOSURE

Prior to biaxially drawing a polyamide film, the film is elongated in the longitudinal direction to an extent of 1 to 15% in addition to the natural elongation due to water adsorption while adsorbing 2 to 10% by weight water. This pretreatment prevents a nonuniformity defect in the film termed "laxation."

BACKGROUND OF INVENTION

This invention relates to processes for the drawing of polyamide films, for example synthetic linear polyamide films preferably comprising poly-ε-caproamide, poly-hexamethylene adipamide, copolymerized polyamides and mixtures of two or more thereof. It is however broadly applicable to synthetic linear polyamides such as additionally polyhexamethylene-sebacamide, poly-11-amino-undecanamide, etc.

The drawing of polyamide films biaxially in the longitudinal and transverse directions has been described for example in U.S. patent application 734,212 filed June 4, 1968, which is incorporated by reference. Biaxially drawn polyamide films prepared by such processes in general possess excellent physical and chemical properties, but the film obtained is sometimes liable to exhibit the disadvantage referred to herein as "laxation" whereby when a drawn film is under tension, at least a part of the film droops downwards or curls upwards in the side regions with respect to the central area so that the film is distorted in the transverse direction. This can give rise to various difficulties when the film is subjected to winding or other after-treatments. The commercial value of such films and articles made therefrom may thus be substantially reduced.

The most common laxation phenomenon is downward drooping in the side regions with respect to the central area of the drawn film. It is reasonable to assume that this phenomenon is caused by differences between the dimensional changes occurring during drawing in the side region of the film and those occurring in the central area. The extent of these differences will depend upon various factors such as for example the temperature at which the film is simultaneously and biaxially drawn, the temperature at which subsequent heat-setting is effected, the draw speeds etc. The sides areas of the drawn film droop downwards owing to the fact that the side regions are elongated in comparison with the central area.

The extent of the dimensional differences causing the laxation phenomenon is small and it is difficult to eliminate or reduce the dimensional differences sufficiently to avoid the disadvantages of the laxation phenomenon. Ideally, the laxation value of drawn polyamide films is not greater than 10 mm. laxation values of 20 mm. or above give poor results in after-treating or processing steps. Conveniently drawing techniques hitherto used have thus failed to reduce the dimensional differences in the longitudinal direction to a sufficient degree to avoid the laxation phenomenon.

It is an object of the present invention to provide a new process for drawing polyamide film which is mainly directed to reducing non-uniformity of elongation (i.e. reducing dimensional differences) in the longitudinal direction and which at the same time is also capable of improving the uniformity of elongation in the transverse direction.

SUMMARY OF THE INVENTION

According to the present invention, polyamide film to be biaxially drawn is first elongated by from 1 to 15% in the longitudinal direction while simultaneously adsorbing water in an amount of from 2 to 10% by weight (based upon the weight of polyamide film). The elongated film is subsequently then drawn simultaneously in the longitudinal and transverse directions. If desired the drawn film may subsequently be subjected to heat-setting e.g. by heating at a temperature of from 120° C. to 5 centigrade degrees below the melting point of the film.

The process according to the invention may be used to produce drawn polyamide films which exhibit the phenomenon of laxation to a reduced degree or in which the said phenomenon is eliminated. The films produced may also be of relatively even thickness in addition to having homogeneous physical and chemical properties.

In the process according to the invention, the polyamide film is preferably drawn simultaneously and biaxially in both the longitudinal and transverse directions at a temperature of from 70° C. to 180° C. and at a ratio of longitudinal and transverse draw speeds of from 0.5 to 2.0 to produce a drawn film having a draw magnification of from 2 to 4 in both longitudinal and transverse directions as described in U.S. patent application 734,212. However the present "pre-trial" step can advantageously be employed with other biaxial drawing processes.

As stated above, the drawn film may, if desired, subsequently be heat-set at a temperature from 120° C. to a temperature not higher than 5° C. below the melting point of the film.

In accordance with the present invention the polyamide film prior to simultaneous and biaxial drawing is subjected to a small degree of elongation in the longitudinal direction in the presence of defined amounts of adsorbed water.

Owing to this pre-treatment prior to simultaneous and biaxial drawing, the pre-treated film is not in general, more easily drawn in the longitudinal direction than in the transverse direction, thus reducing or eliminating non-uniformity in drawing, particularly in the longitudinally direction.

When the film is elongated by a large amount (i.e. with large magnification) in the longitudinal direction, the subsequent simultaneous and biaxial drawing can give rise to various difficulties other than non-uniformity of drawing, for example so-called "necking out."

On the other hand, elongation with a magnification below 1% in the longitudinal direction in the presence of adsorbed water has little effect in reducing the phenomenon of laxation.

When the film is previously elongated by the small amount of from 1% to 15% in the longitudinal direction without the simultaneous presence of water which can be adsorbed in accordance with the present invention, non-uniform elongation as well as necking out and uneven thickness of the drawn film may result. By the precess of this invention involving the elongation of the undrawn film by 1% to 15% in its longitudinal direction and the simultaneous adsorption of water of from 2% to 10% by weight, it is however possible to elongate the undrawn film uniformly and to avoid other difficulties.

When the film is elongated with low magnification either before or after the water adsorption by the film, it is difficult to obtain uniformly drawn film in the subsequent drawing step, for example, owing to the generation of necking-out difficulties.

The preferred range for the magnification in the longitudinal elongation of the undrawn film is from 2% to 10%.

The polyamide film will be elongated due to adsorption of water. The elongation of 1 to 15% effected in accordance with the present invention is additional to the "natural elongation" due to adsorption of water, the "natural elongation" of the film upon adsorption of water being the elongation of the film when water is adsorbed under substantially no tension. References herein to "elongation" and "substantial elongation" are intended to refer to elongations additional to natural elongation upon adsorption of water.

The adsorption of water has great influence upon the subsequent simultaneous and biaxial drawing step, and can be carried out in any suitable manner. For example, the film may be immersed in a water bath, sprayed with water, or left in an atmosphere having a suitable humidity. It is advantageous to adsorb water onto the film at a temperature not more than about 70° C., otherwise the crystallinity of the treated polyamide may increase in the presence of water and this can cause difficulties in the subsequent simultaneous and biaxial drawing step.

The preferred amount of the water adsorbed onto the film may of course vary, depending upon various factors such as, for example, the type and thickness of the treated film. It has been found that an adsorbed amount of water below 2% (by weight) results in non-uniform drawing in the subsequent simultaneous and biaxial drawing step owing to necking out, while an excessively large amount of adsorbed water such as about 10% by weight is liable to increase unevenness of thickness in the drawn film obtained after subsequent simultaneous and biaxial drawing. The preferred amount of water adsorbed is from 3 to 8% by weight based upon the weight of polyamide film.

The amount of water which can be adsorbed may vary depending upon the type of polyamide. In this respect, it is desirable for producing uniformly drawn polyamide films to maintain the adsorbed amount of water below the amount of adsorbed water required to saturate the polyamide film.

The use of water along in the pre-treatment according to this invention is satisfactory, but it is also possible to use water into which has been incorporated additives such as, for example, dyestuffs, surface active agents, plasticisers, etc.

DRAWINGS

The extent of the laxation (hereinafter designated as laxation value) can easily be determined, for example, by using an apparatus illustrated in FIG. 1 of the accompanying drwaings. A pair of rollers each having a diameter of about 80 mm. are arranged in parallel relationship at a distance of 130 cm., between which a drawn film is stretched with a load of 12 g. per 10 mm. width. The amount of drooping at the centre $h'$ and that at one side $h$ are measured with respect to the horizontal plane between the two rollers to give a laxation value $(h-h')$. Whether the drawn film curls upwards or droops downwards to provide distortion in its transverse direction, it is possible to determine the laxation value in the manner described above.

It has been observed that drawn films can exhibit the laxation phenomenon even when the differences between the dimensional changes in length in the side and central areas is extremely small.

Figure 1:
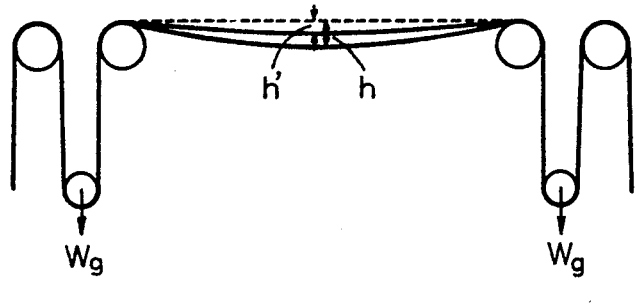
FIG. 1 depicts an apparatus suitable for determining the extent of laxation.
Figure 2:
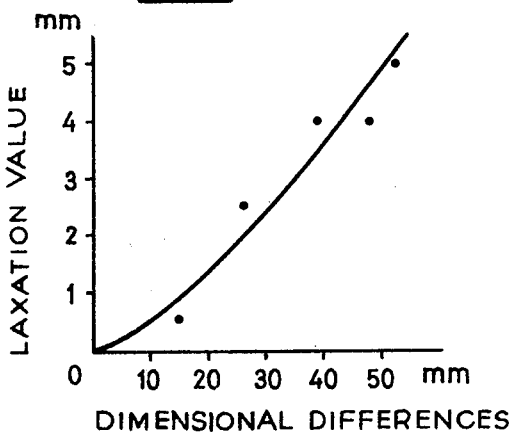
FIG. 2 illustrates the relationship of laxation value to differences in side and center lengths of a drawn sheet.

Referring to FIG. 2, of the accompanying drawings, the relationship of the laxation value to the differences between the length of the centre line and that of the side line was determined on a drawn poly-ε-caproamide film having a width of 500 mm. and a thickness of $25\mu$ using the apparatus shown in FIG. 1. After the measurement of the laxation value, the film was divided into several sections each having a width of about 10 mm. by cutting in the longitudinal direction. The length of each section was measured on its centre line and at the side line to give the difference between them.

It has been found that a laxation value of less than 20 mm., independent of the width of the drawn film is generally for practical purposes harmless while a laxation value of 20 mm. or above is disadvantageous for carrying out after-treatments or processing the drawn film. Ideally the laxation value of drawn polyamide films is not greater than 10 mm. As can be seen from FIG. 2, the laxation phenomenon is caused by the dimensional differences in the longitudinal direction between the central and side areas, which are in turn caused by non-uniform elongation in the longitudinal direction during drawing of the film.

Figure 3:
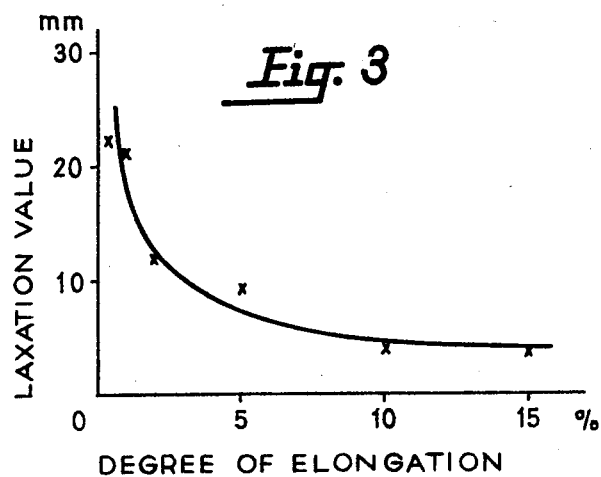
FIG. 3 shows the relationship of laxation value and degree of elongation.

FIG. 3 of the accompanying drawings shows graphically the relationship between laxation value and elongation of undrawn film. Samples of an undrawn poly-ε-caproamide film having a thickness of $252\mu$ were immersed in a water bath to adsorb 5% (by weight) of water. Each sample was elongated in the bath to give a substantial elongation ranging from 0.5% to 15%. Each of the samples was then simultaneously and biaxially drawn at a temperature of about 90° C. with a draw speed of 30,000%/min. and at a ratio of draw speeds of from about 1 to about 1.3 to obtain a film drawn with a magnification of 3 and 3.5 times in the longitudinal and transverse directions respectively. From the graph of FIG. 3 it is apparent that an elongation of more than 1% and preferably more than 2%, in the longitudinal direction significantly decreases the laxation value.

Figure 4:
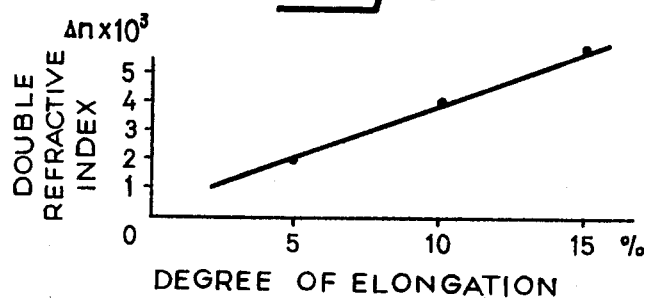
FIG. 4 illustrates the relationship of degree of elongation and "double refractive index"

FIG. 4 of the accompanying drawings shows graphically the relationship between elongation and "double refractive index" by using an undrawn poly-ε-caproamide film (thickness—$252\mu$) with adsorption of 5% by weight of water (the double refractive index is generally used for indicating the degree of molecular orientation of drawn thermoplastic films). From this figure, it is apparent that the degree of molecular orientation depends largely upon the extent of the elongation.

As is apparent from the above description, an excessive or non-uniform elongation of undrawn film can give rise to various disadvantages such as necking out and breakage of the film during the subsequent drawing step, uneven thickness of the drawn film, etc.

Figure 5:
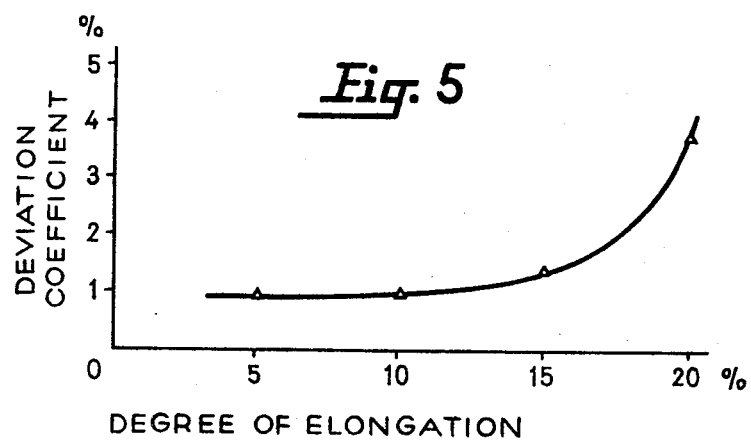
FIG. 5 depicts a similar relationship of degree of elongation to "deviation coefficient"
Figure 6:
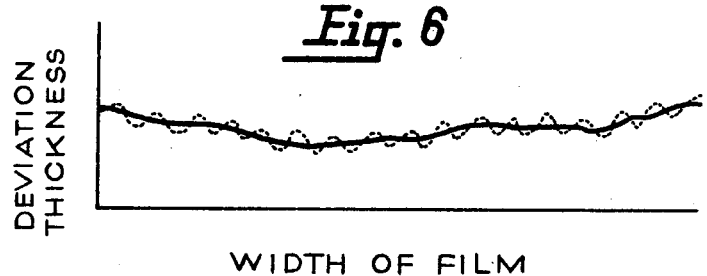
FIG. 6 shows the deviations in thickness across the width of polyamide film.

FIG. 5 and the accompanying drawings shows graphically the relationship between "elongation" and "deviation coefficient" (as defined below). FIG. 6 shows the deviations in thickness across the width of a polyamide film. Deviations of the thickness from the average thickness of the drawn film may be classified into, so to speak, speaking "small deviations" include those caused by various conditions of the film prior to drawing, for example by the degree of crystallinity of the film and the conditions used in any pre-treatments of the undrawn film. These deviations can be considered as "Precursors" of necking out, and may give rise to non-uniformity of the drawn film. On the other hand, "large deviations" are caused, for example, by the thickness distribution in the raw film, drawing conditions, etc. and can more or less be eliminated by avoiding the causes thereof. In the drawing of polyamide film having the disadvantages of, for example, strong hydrogen bonding and necking out, however, it is extremely difficult to eliminate disadvantages resulting from small or large deviations so that there are great difficulties in preparing drawn polyamide films having uniform thickness. By the process according to this invention, however, it is possible to eliminate difficulties which have hitherto arisen.

Excessvely large magnification of the elongation (greater than 15%) prior to simultaneous and biaxial drawing should be avoided because, although it may indeed be advantageous for eliminating the laxation difficulties, it can give rise to various other difficulties such as the production and increase of small deviations which are liable to cause necking out.

It has been found, in this respect that the most advantageous magnification ratio of the longitudinal elongation of the film prior to simultaneous and biaxial drawing can readily be determined on the basis of the "deviation coefficient" because this coefficient can be regarded as being capable of indicating properly the "small deviation."

The concept of the deviation coefficient is described in detail in Akira Horikawa's "Analysis of Random Deviation," published by Kyoritsu Publication Inc., Tokyo, Japan on May 20, 1966. This document describes the use of a plurality of samples of a simultaneously and biaxially drawn polyamide film for determination of the deviation coefficients in the following manner:

Each sample was measured many times at distances of 10 mm. in the transverse direction to obtain the thickness which were then subjected to the moving average method with a moving length of 50 mm. The "small deviations" were eliminated to obtain a smooth curve (shown as a full line in FIG. 6) which indicates the "large deviations." The deviations from this smooth curve were quantitatively determined as the small deviations indicated as a dotted line shown in FIG. 6. In FIG. 5, the deviation coefficient was calculated by taking account of moving averages up to the second arithmetic moving average so that the deviation coefficient was obtained from the series of the second arithmetic moving average.

Although it can be said that the smaller the deviation coefficient is, the better the quality of the drawn film, drawn films having a deviation coefficient of about 2% or less can be regarded as good films for practical and general purposes.

In order to obtain the results shown in FIG. 5, samples of an undrawn poly-ε-caproamide film (thickness—252μ) were allowed to adsorb water (5% by weight), while they were given elongations of from 5% to 20% in the longitudinal direction. The samples were then simultaneously drawn at a temperature ranging from about 90° C. and at a draw speed of about 24,000%/min., the ratio of draw speeds being from 1.0 to 1.3 and the draw magnification being 3 times in the longitudinal direction and 3.5 times in the transverse direction.

From FIG. 5, it is concluded that uniformly drawn polyamide films can advantageously be obtained by giving to the film a substantial elongation of about 15% or less prior to drawing.

The following examples illustrate the invention:

EXAMPLE 1

A conventional casting procedure was carried out to form an undrawn film (thickness–252μ; width—about 250 mm.) made of poly-ε-caproamide resin (relative viscosity—2.7). The film was immediately passed through a water bath with a delivery speed of 19 m./min. The length of the dipping section of the water bath was 125 m. and the water temperature was 57° C. The film was withdrawn from the bath with a speed of 20 m./min. so that the elongation of the film in the longitudinal direction was about 3% in length, while the amount of water adsorbed onto the film was about 5.8%.

The film was fed at a speed of about 20 m./min. to a drawing device which carried out simultaneous and biaxial drawing in an atmosphere having a temperature of about 120° C. to produce a drawn film having a magnification of 3 and 3.5 times in the longitudinal and transverse directions respectively with a draw speed of about 34,000%/min. and at a ratio of draw speeds of about from 0.9 to 1.3. The drawn film was heat-set in an atmosphere at a temperature of 215° C. for 8 seconds under tension such that the transverse dimension would be constant. The film obtained had an average thickness of 24μ and a width of 500 mm.

The laxation of the film obtained was at maximum at both side edges and the laxation value was 5 mm. Deviation coefficient was 1 and the deviation from the average thickness was less than ±1.0μ in all directions.

For comparison purposes, control films were prepared in a similar manner to that described above except that the elongation were approximately 0% and 20% in length after treatment with water. Properties of the films obtained are compared with those of the control films in the following table, in which a negative laxation value indicates that the side portions of the film are raised upwards.

TABLE I

A—Elongation during water treatment (percent)
B—Laxation value (mm.) measured at the side edges
C—Deviation coefficient (percent)

|  | A | B | C |
| --- | --- | --- | --- |
| Example 1 | 3 | 5 | 1 |
| Control | 0 | 30 | 1 |
| Do | 20 | −5 | 3.5 |

EXAMPLE 2

An undrawn film having a thickness of 215μ and a width of about 270 mm. made of poly-ε-caproamide (relative viscosity—2.7) was prepared by conventional casting methods. The film was fed to a water bath (width of the dipping section—60 m.; temperature of treating water—48° C.) at a speed of 10 m./min. and was withdrawn at a speed of 11 m./min., whereby the film was elongated by about 8% in the longitudinal direction. The water content of the thus treated film was about 5.0%.

The film was then subjected to simultaneous and biaxial drawing with a feeding speed of about 11 m./min., the film being drawn in an atmosphere having a temperature of about 150° C. under the following conditions:

Magnification:
    (Longitudinal)—×3
    (Transverse)—×3
Draw speed—about 30,000%/min.
Ratio of draw speeds—1.0–1.2

The drawn film was then heat-set in an atmosphere having a temperature of 210° C. under tension for 6 seconds to yield a drawn film having a thickness of 24μ—(average) and a width of 500 mm. The laxation value of 6 mm. and deviation coefficient below 1% indicated that the film obtained had excellent properties.

EXAMPLES 3 AND 4

An undrawn film having a thickness of 158 mμ and a width of about 250 mm. made of poly-ε-caproamide (relative viscosity—3.0) was prepared by using a conventional casting method. The film was fed through a water bath the length of the film dipped into the bath being 125 m. The inlet speed and outlet speed of the film and the temperature of the treating water were varied as indicated in the following table to produce different samples of water-treated films.

Each sample was thereafter drawn simultaneously and biaxially in an atmosphere having a temperature of 100°

C. with a draw speed of about 24,000%/min. at a ratio of draw speeds of 0.9 to 1.3 and with a magnification of 3 (longitudinal) and 3.5 (transverse). The drawn film was heat-set at 200° C. for 4 seconds, while the transverse dimension of the film was maintained constant. There was obtained a drawn film having an average thickness of 15µ.

For comparison purpose, a similar undrawn film was treated in a similar manner to that described above with the exception that the undrawn film was not treated with water and was given an elongation of 10% in the longitudinal direction. (Control A). Further, another sample of the undrawn film was also treated in an analogous manner to that described above except the film was treated to adsorb an excessive amount of water, i.e. 11% (Control B). The properties of the films obtained were determined and are shown in the following table.

TABLE II

A—Water content (percent)
B—Inlet speed (m./min.)
C—Outlet speed (m./min.)
D—Temperature of water (° C.)
E—Elongation during water treatment (approximate value, percent)
F—Laxation value (mm.)
G—Deviation coefficient (percent)

| | Data | | | | | | |
|---|---|---|---|---|---|---|---|
| | A | B | C | D | E | F | G |
| Example 3 | 3 | 19 | 20 | 25 | 3.5 | 7 | 1 |
| Example 4 | 8 | 15 | 17 | 48 | 10.0 | 5 | 1 |
| Control A | 0 | (*) | (*) | (*) | (*) | | 10 |
| Control B | 11 | 11 | 12.5 | 54 | 10.0 | 8 | 4 |

*Longitudinally elongated (about 10%) immediately before drawing.

EXAMPLE 5

An undrawn film having a width of about 530 mm. and a thickness of about 260 made of poly-ε-caproamide (relative viscosity—2.7) was prepared by conventional casting methods in which a 150 mm. extruder was used to extrude poly-caproamide through a T-die at 260° C. on the surface of a casting drum (cooling water temperature—25° C.) with a feeding speed of 19 m./min. The film was passed through a water bath (length of the film in bath—125 m.; temperature of the treating water—60° C.) with an inlet speed of 19 m/min., in which the film was given an elongation of about 8% in the longitudinal direction while the film adsorbed a water content of about 6%. The outlet speed of the film was about 21 m./min.

The film treated with water was thereafter continuously subjected to biaxial and simultaneous drawing with a feeding speed of about 21 m./min. The drawing was performed in an atmosphere having a temperature of about 150° C. at a ratio of draw speeds of 0.9 to 1.3 with a draw speed of about 25,000%/min. and with a magnification of 3.3 (longitudinal) and about 3.8 (transverse). The drawn film was heat-set at 215° C. for 2 seconds, was shrunk in the transverse direction by an amount of about 3%, was maintained at 200° C. for one second, and was cooled to 30° C. to yield a drawn film having an average thickness of about 20µ and a width of 1,500 mm. The film had its maximum laxation value of 5 mm. at both side regions and the deviation coefficient was 0.5%. From these figures it is apparent that the film obtained has excellent properties.

Having described the present invention, that which is sought to be protected is set forth in the following claims.

What we claim is:

1. In a process for biaxially drawing polyamide films, wherein the polyamide film is drawn simultaneously in the longitudinal and transverse directions at a temperature of from 70° C. to 180° C. and at a ratio of longitudinal and transverse draw speeds of from 0.5 to 2.0 and a draw magnification of 2 to 4, the improvement which comprises, first drawing the polyamide film so as to elongate it by from 1 to 15% in the longitudinal direction in addition to elongation due to water adsorption while it simultaneously adsorbs water in an amount of from 2 to 10% by weight based upon the weight of the polyamide film under temperature conditions so as to not substantially increase the crystallinity of the treated polyamide film, and thereafter subjecting the thus elongated film to drawing simultaneously in the longitudinal and the transverse directions.

2. A process as claimed in claim 1 wherein the amount of water adsorbed during elongation is from 3 to 8% by weight based upon the weight of polyamide film.

3. A process as claimed in claim 1 wherein the amount of water adsorbed is less than the amount of water required to saturate the polyamide film.

4. A process as claimed in claim 1 wherein the polyamide film is immersed in a water bath so as to adsorb from 2 to 10% by weight of water during elongation.

5. A process as claimed in claim 4 wherein the polyamide film is continuously passed through the water bath.

6. A process as claimed in claim 5 in which the withdrawal speed of the polyamide film from the water bath is greater than the delivery speed of the polyamide film to the water bath whereby the polyamide film is elongated in the longitudinal direction by 1 to 15%.

7. A process as claimed in claim 1 wherein the polyamide film to be drawn is elongated by from 2 to 10%.

8. A process as claimed in claim 1 wherein after biaxial drawing the drawn film is subjected to heat-setting.

9. A process as claimed in claim 8 in which heat-setting is effected at a temperature of from 120° C. to at least 5 centigrade degrees below the melting point of the film.

10. A process as claimed in claim 1 wherein the polyamide film is a linear polyamide film.

11. A process as claimed in claim 10 in which the polyamide film is selected from the group consisting of poly-ε-caproamide, polyhexamethylene adipamide, a copolymerised polyamide, and a mixture of two or more thereof.

12. The process of claim 1 wherein said water adsorption-elongation step is at a temperature of not more than 70° C.

13. A process for biaxially drawing a linear polyamide film which comprises:
    (a) subjecting the film to longitudinal elongation in the presence of water under temperature conditions as to not substantially increase the crystallinity of the treated film so as to elongate the film from 1 to 15% in the longitudinal direction in addition to elongation due to water adsorption, while adsorbing 2 to 10 weight percent water based on film, and then
    (b) subjecting the thus treated film to biaxially drawing at a temperature of 70° C. to 180° C. and at a ratio of longitudinal and transverse drawing speeds of 0.5 to 2.0 to produce a drawn film having a laxation value of less than 20 and a draw magnification of from 2 to 4.

References Cited

UNITED STATES PATENTS 3,324,218  6/1967  Gebler et al. _____ 264—289
3,510,552  5/1970  Tsuruta et al. _____ 264—289

DONALD J. ARNOLD, Primary Examiner

H. MINTZ, Assistant Examiner

U.S. Cl. X.R.

260—78 S; 264—288